United States Patent [19]
Woods et al.

[11] Patent Number: 5,918,619
[45] Date of Patent: Jul. 6, 1999

[54] SAFETY PRESSURE RELIEF VALVE ASSEMBLY, COMPONENTS THEREFOR AND METHODS OF MAKING THE SAME

[76] Inventors: Ronald Woods, 5186 N. Farm Rd. 159, Springfield, Mo. 65803; Joseph M. Nusbaumer, 1602 Oak Ridge Ct., Nixa, Mo. 65714

[21] Appl. No.: 08/767,944

[22] Filed: Dec. 17, 1996

[51] Int. Cl.[6] .................................................. F16K 15/06
[52] U.S. Cl. ........................... 137/15; 137/315; 137/382; 137/542; 137/543.23; 137/544
[58] Field of Search ............................. 137/15, 315, 382, 137/540, 542, 543.23, 544

[56] References Cited

U.S. PATENT DOCUMENTS

| | | | |
|---|---|---|---|
| 1,644,265 | 10/1927 | Noble | 137/543.23 X |
| 2,000,431 | 5/1935 | Aumack | 137/542 |
| 2,563,563 | 8/1951 | Swenson | 137/542 X |
| 2,781,778 | 2/1957 | Lisciani | 137/540 |
| 3,129,158 | 4/1964 | Rodgers | 137/493.9 |
| 3,797,511 | 3/1974 | Selby | 137/542 X |
| 3,976,096 | 8/1976 | Kass | 137/493.2 |
| 5,060,688 | 10/1991 | Sorensen | 137/471 |
| 5,141,024 | 8/1992 | Hicks | 137/542 X |

*Primary Examiner*—John Rivell
*Attorney, Agent, or Firm*—Richard L. Marsh

[57] ABSTRACT

A safety pressure relief valve assembly is provided wherein the safety pressure relief valve assembly has a first tubular body with a first end and a second end, a wall of given thickness with a bore through the body with an internal flange and a valve support in the bore, a means on the first end of the body for attaching the body to the venting system of a fuel tank, a valve seat in the internal flange, a valve member adapted for resting on the seat and having a stem extending from one side of the valve member, a biasing means for biasing the valve member against the valve seat in a direction toward the first end, a discharge means in the second end having an enclosing flange for the second end, a second tubular body of larger internal diameter than the external diameter of the first tubular body with one of the open ends of the second tubular body affixed to the enclosing flange wherein the enclosing flange and second tubular body comprise means preventing the inclusion of foreign objects from entering the second end of the first body thereby keeping the safety pressure relief assembly in full operational condition at all times.

20 Claims, 5 Drawing Sheets

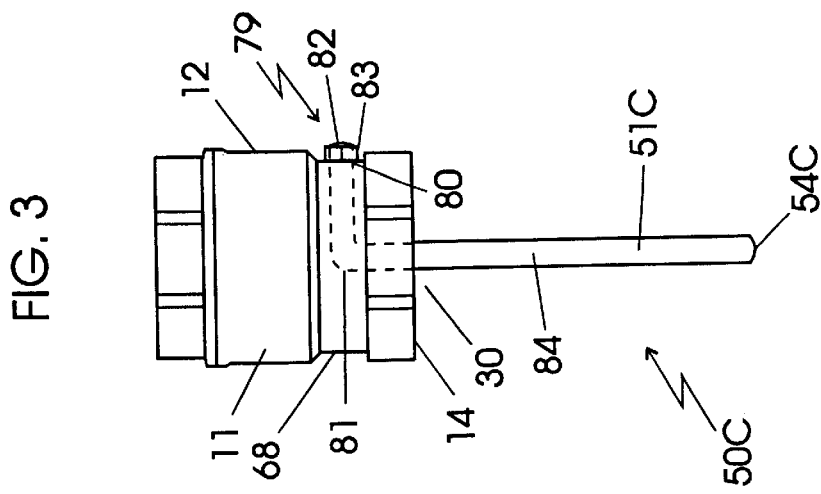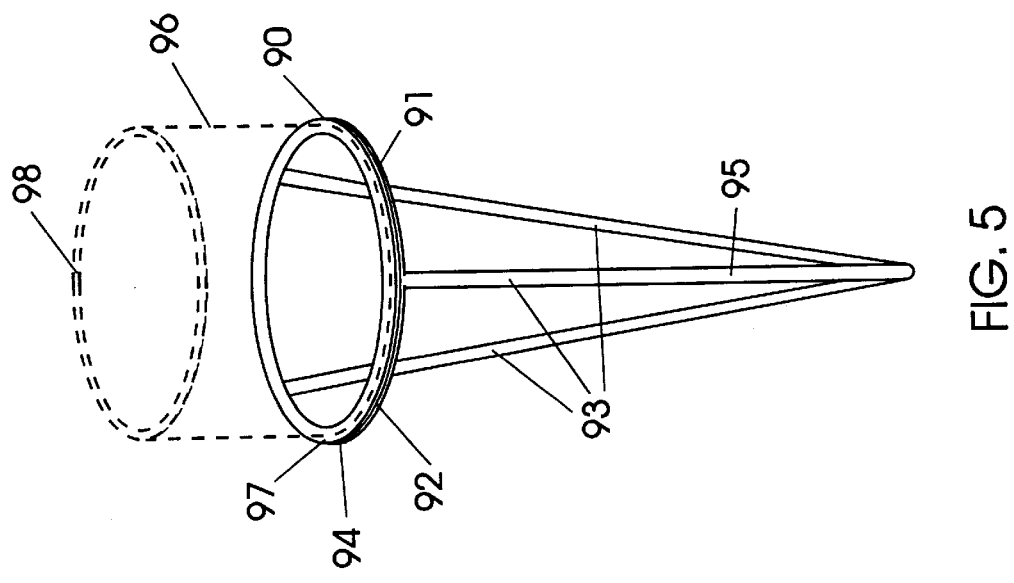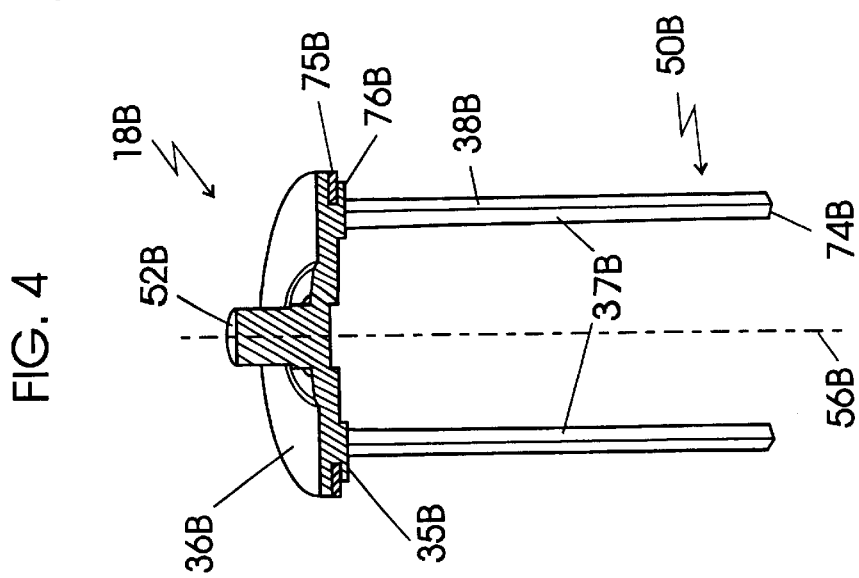

5,918,619

SAFETY PRESSURE RELIEF VALVE ASSEMBLY, COMPONENTS THEREFOR AND METHODS OF MAKING THE SAME

BACKGROUND OF THE INVENTION

1. Field of the Invention

This invention relates to a safety pressure relief valve assembly having anti-blocking means associated with at least one of the open ends thereof for preventing foreign matter from entering the ends thereby keeping the safety pressure relief assembly in full operational condition at all times.

2. Prior Art Statement

A pressure relief valve as commonly utilized on the fill spout of an automobile fuel tank comprises a portion of the closure of the tank. This closure is generally further enclosed in a receptacle disposed in the fender of the automobile for protection from the elements. Such mountings are not, however, commonplace in railroad locomotives which have fuel tanks mounted from the lower portion of the frame extending from side to side of the locomotive. The locomotive fuel tank commonly has a solid closure for the end of the fuel spout and usually has a vent port disposed in the upper surface of the tank remote from the fuel spout. The fuel tank venting system then has a vent pipe associated with the vent port extending along the upper surface and one end of the tank. The terminal end of the vent pipe is open to the atmosphere and is often located just forward of one wheel of the locomotive. The terminal end of the vent pipe has a tendency to become blocked with an accumulation of ice and snow thrown against the end of the fuel tank and the vent pipe during periods of inclement weather. In other cases, a safety pressure valve having an open discharge end is mounted on the vent port on the top surface of the tank remote from the fuel spout. Pressure relief valves for locomotives are generally tubular having a body defined by at least one upstanding peripheral wall and having open ends, means associated with one end of the body for attaching to a fuel tank, a bore through the body, a valve seat disposed in an internal flange in the bore and a valve member resting on the seat, the valve member having a biasing means associated therewith for biasing the valve member against the valve seat in a direction toward the one end. Such a valve is part number 3397E manufactured by Clayton Mark, Inc. of Rogers, Ark. This valve has an open end which is generally upwardly disposed and is subject to accumulation of foreign matter in the open end thereof which may block the proper operation of the valve. For instance, ice formed from rain or the melting of snow and subsequent freezing thereof is a common failure of these pressure relief valves and when the locomotive is fueled, splash back occurs when the nozzle is removed from the tank as the tank has become pressurized. This safety hazard may result in fire but always results in spillage of fuel into the environment. Therefore, there exists a need for a safety pressure relief assembly having a means on the discharge end thereof for preventing foreign matter from entering the discharge end thereby keeping the safety pressure relief assembly in full operational condition at all times.

Locomotive fuel tanks also usually have a tank level indicator comprising a float attached to the end of an elongated arm pivotally mounted in an indicating device. The vibration of the locomotive engine and the movement of the fuel in the tank often causes the float to become separated from the elongated arm. The float migrates toward the pressure vent port as the air above the fuel is vented during the fueling operation. The float becomes lodged in the end of the vent port causing pressure to build up in the fuel tank during fueling operations creating a hazardous material spill into the environment. Therefore, there also exists a need for a safety pressure relief assembly having a means associated with the inlet end thereof for preventing the inclusion of foreign matter in the inlet end thereby keeping the safety pressure relief assembly in full operational condition at all times. There is also a need to have a fuel tank venting system having means associated with the vent port for preventing the inclusion of foreign matter in the tank from blocking the vent port thereby allowing full functionality of a safety pressure relief valve assembly disposed elsewhere in the venting system.

It is known to provide a pressure relief valve for tankers for oil products and chemicals having an upwardly facing blow-off opening with a valve and valve seat in the opening from which ice may be manually removed. For instance, see the U.S. Pat. No. 5,060,688 issued on Oct. 29, 1991 to Emil Sorensen.

It is also known to provide a safety pressure-vacuum relief assembly for remote mounting on a vehicle fuel tank comprising a tubular fitting having an flared upper end with a plurality of venting holes in a flat plastic plate resting on a substantially flat flange circumscribing the upper end with an inverted cup having a peripheral skirt encompassing the plastic plate and the flange, the inverted cup having ports in a floor thereof and the assembly having a shield with a down turned peripheral skirt axially spaced from the cup floor. For instance, see the U.S. Pat. No. 3,929,158 issued on Dec. 30, 1975 to Robert E. Rogers.

Finally, it is known to provide a fluid flow-controlling valve comprising a valve body, a valve seat extending around a bore in the body, a relief valve element coaxial with and arranged for axial displacement within the bore and a cap coaxial with the bore wherein the cap has a radial bore intercepting a bore in the upper end of the cap providing the safety VIP relief outlet. For instance, see the U.S. Pat. No. 3,976,096 issued on Aug. 24, 1976 to Gerald H. Kass.

SUMMARY OF THE INVENTION

It is an object of this invention to provide a safety pressure relief assembly comprising a body defined by at least one upstanding peripheral wall and having open ends, a means associated with the inlet end of the body for attaching to a fuel tank, a bore through the body, a valve seat disposed in an internal flange in the bore and a movable valve member resting on the seat, the valve member having biasing means associated therewith for biasing the valve member against the valve seat in a direction toward the inlet end and wherein the end opposite the inlet end, the outlet, has a means associated therewith for preventing foreign matter from entering the outlet.

It is another object of this invention to provide a safety pressure relief assembly having a valve body and a means for preventing inclusion of foreign matter, wherein the outlet end has a discharge means disposed in a wall of the body for discharging pressure above atmospheric pressure into the means for preventing inclusion of foreign matter.

Still another object of this invention is to provide a safety pressure relief assembly having a valve body and a means for preventing inclusion of foreign matter, where a discharge means in a wall of the body is at least one port machined into the wall and having a portion of the surface of the port defined by a portion of the means for preventing inclusion of foreign matter.

Yet another object of this invention is to provide a safety pressure relief assembly having a valve body and a means for preventing inclusion of foreign matter wherein a port in a wall of the body has a concave surface recessed into a wall of the body from the terminal end thereof and further has an enclosing surface formed by a planar surface of the means for preventing inclusion of foreign matter.

It is also an object of this invention to provide a safety pressure relief assembly having a valve body and a means for preventing inclusion of foreign matter in the outlet end thereof, the means comprising an inverted cup associated with the outlet end which encloses the bore and extends substantially the full length of the body from the outlet end to at least a lower surface of a removal means associated with the valve body.

It is an object of this invention to provide a safety pressure relief assembly wherein an inverted cup comprising means for preventing inclusion of foreign matter has an open end for discharging pressure above atmospheric pressure.

It is still another object of this invention to provide a safety pressure relief assembly having an inverted cup comprising means for preventing inclusion of foreign matter, wherein the inverted cup has a closed end and an open end, the closed end having a discharge means disposed in a downwardly directed threaded internal wall attached to the closed end.

It is a further object of this invention to provide a safety pressure relief assembly wherein a downwardly directed threaded internal wall of an inverted cup comprising means for preventing inclusion of foreign matter is threadedly engaged with the outlet end.

It is also an object of this invention to provide a safety pressure relief assembly mounted substantially vertically on the tank having a release means downwardly directed.

Still another object of this invention is to provide a safety pressure relief assembly mounted substantially horizontally on the tank having a release means horizontally directed.

Another object of this invention is to provide a safety pressure relief assembly mounted substantially horizontally on the tank having a release means downwardly directed.

It is a further object of this invention to provide a safety pressure relief assembly comprising a body defined by at least one upstanding peripheral wall and having open ends, means associated with one end of the body for attaching to a fuel tank, a bore through the body, a valve seat disposed in an internal flange and a valve support in the bore, a valve member resting on the seat, the valve member having biasing means associated with a stem of a valve member for biasing the valve member against the valve seat in a direction toward the one end, wherein the inlet end has anti-blocking means associated therewith for preventing the inclusion of foreign objects therein.

It is still another object of this invention to provide a safety pressure relief valve assembly as hereinafter described mounted in a branch "T" in the vent pipe of the venting system having an anti-blocking means associated with the vent port of the fuel tank.

A further object of this invention is to provide a safety pressure relief assembly having a valve body and an anti-blocking means on the outlet end which comprises an inverted cup permanently affixed to the outlet end wherein the inverted cup encloses a bore through the body and extends substantially the full length of the body from the outlet end to at least a lower surface of a removal means associated with the valve body which limits access to the removal means thereby preventing removal of the assembly from a tank.

Still another object of this invention is to provide a safety pressure relief assembly having a valve body with an anti-blocking means on the inlet end which comprises at least one elongated finger extending into the tank from the inlet end of the valve.

A further object of this invention is to provide a method of making a safety pressure relief assembly by forming a first tubular body having a first end and a second end, a wall of given thickness with a bore through the body and having an internal flange and a valve support in the bore, forming a means on the first end of the body for attaching the body to a fuel tank, forming a valve seat in the internal flange, forming a valve member adapted for resting on the seat and having a stem extending from at least one side of the valve member, forming a biasing means, inserting the stem of the valve member through the biasing means and the valve support, bearing one end of the biasing means against the valve support and the other end against an outlet surface of the valve member thereby biasing the valve member against the valve seat in a direction toward the first end, forming a discharge means in the second end, forming an enclosing flange for the second end, affixing the enclosing flange on the second end, forming a second tubular body of larger internal diameter than the external diameter of the first tubular body affixing one of the open ends of the second tubular body to the enclosing flange wherein the enclosing flange and second tubular body comprise means preventing foreign objects from entering the first end of the first body thereby keeping the safety pressure relief assembly in full operational condition at all times.

It is another object of this invention to provide a safety pressure relief assembly wherein the outlet end has a discharge means extending from the wall of the body and supported above the terminal end of the wall means for preventing foreign matter from entering the outlet.

It is yet another object of this invention to provide safety pressure relief assembly having an anti-blocking means extending into the tank from a central stem of a valve member or from the undersurface of a valve member spaced from the central stem or from a guide means associated with a valve member.

Finally, it is an object of this invention to provide safety pressure relief assembly having an anti-blocking means extend into the tank which is disposed through and attached to the wall of a valve body or comprises a thin threaded ring threaded into a one end of the valve body and having at least one elongated finger extending therefrom.

BRIEF DESCRIPTION OF THE DRAWINGS

FIG. 3 is a perspective view of an alternate anti-blocking member associated with the safety pressure relief assembly of this invention.

FIG. 4 is a section view of an alternate valve member utilized in the safety pressure relief assembly of this invention.

FIG. 5 is a perspective view of an alternate anti-blocking member utilized in the safety pressure relief assembly of this invention.

DESCRIPTION OF THE PREFERRED EMBODIMENTS

While the various features of this invention are hereinafter described and illustrated as a means to provide for pressure relief from a fuel tank and to provide means on either or both the inlet or outlet to prevent the inclusion of foreign matter in the inlet or outlet, it is to be understood that the invention can be used for a variety of uses as hereinafter described.

Figure 1:
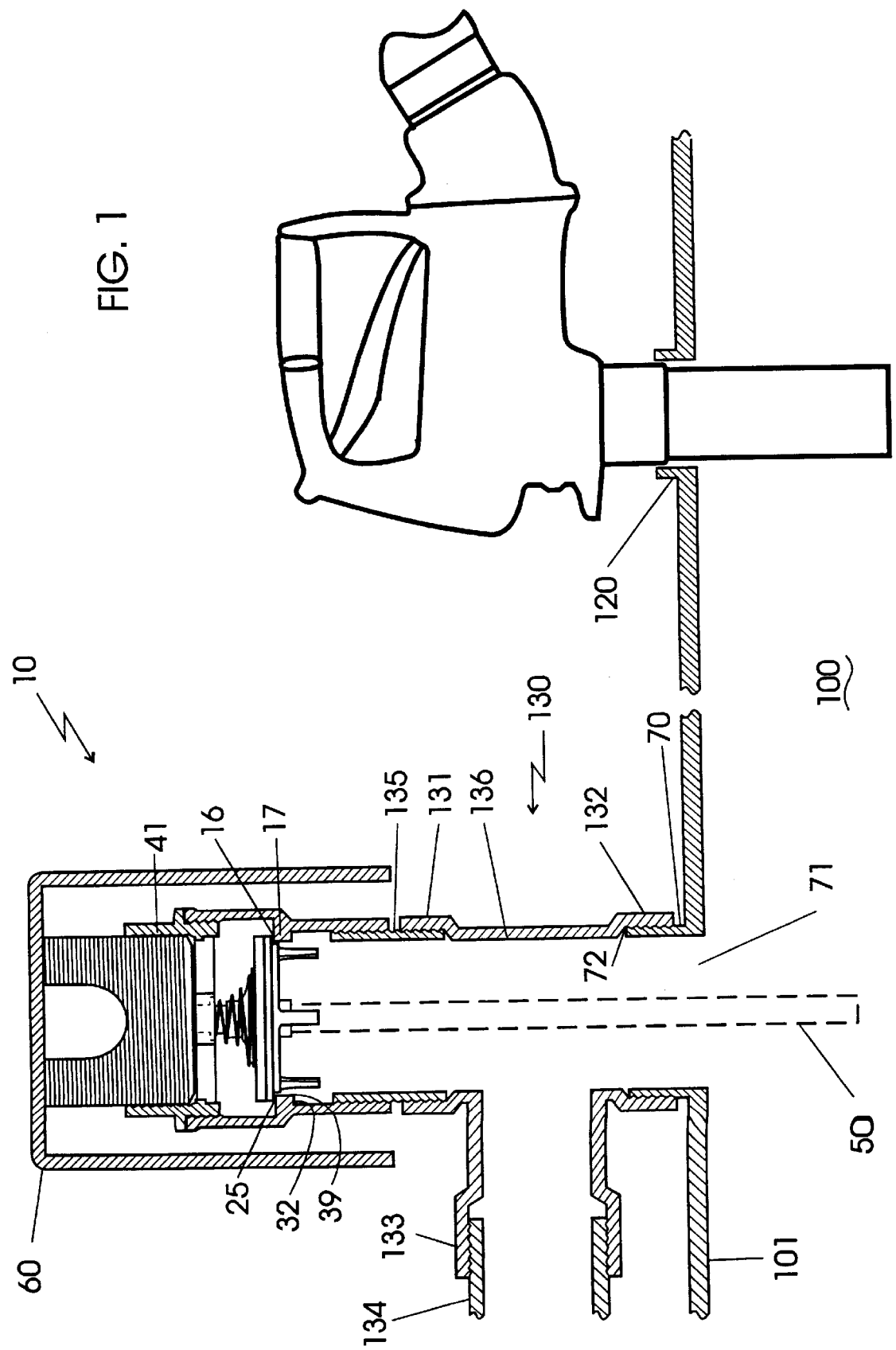
FIG. 1 is a partially broken away view of the safety pressure relief assembly of this invention mounted on a locomotive fuel tank.
Figure 2:
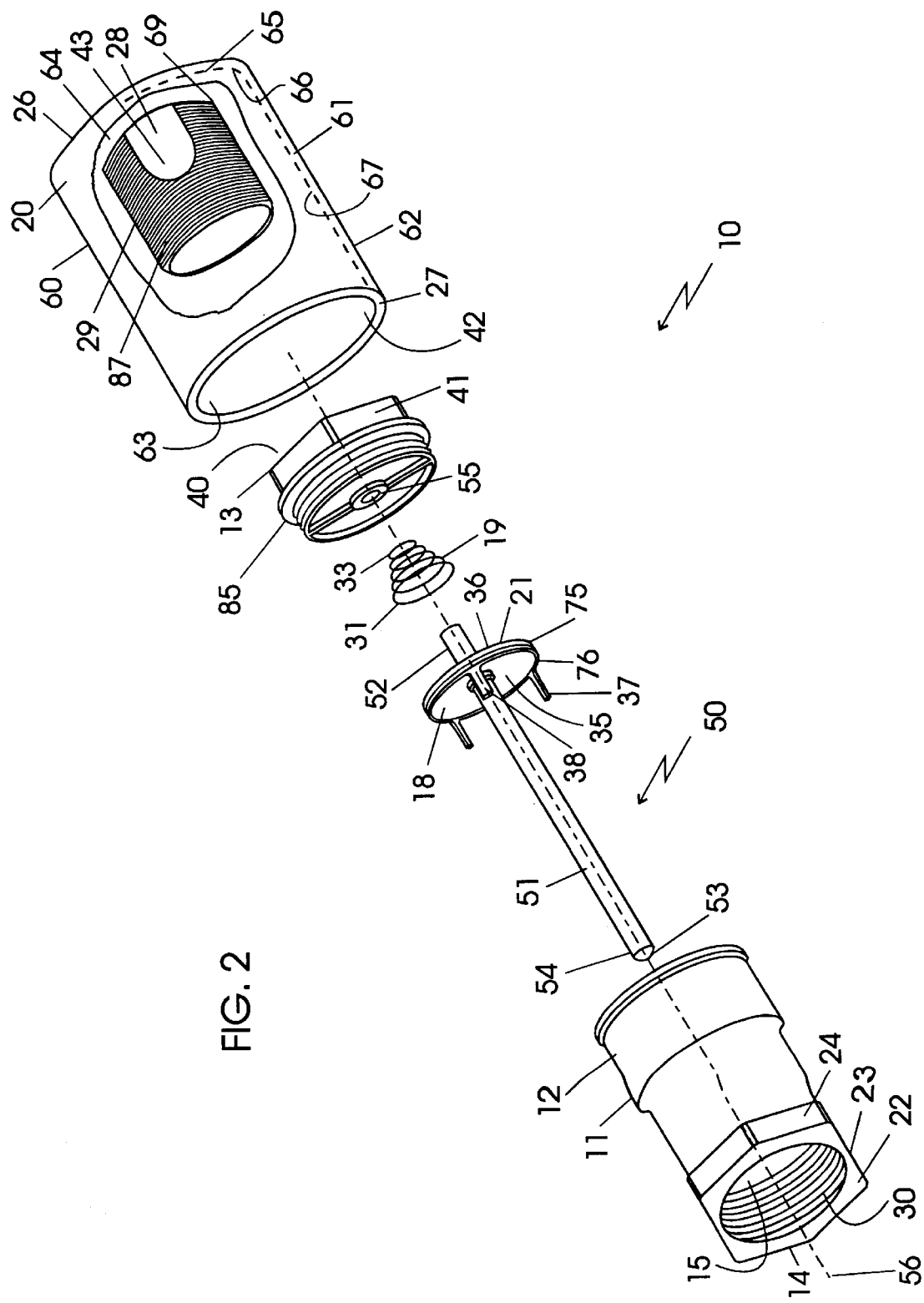
FIG. 2 is an exploded perspective view of the preferred embodiment of the safety pressure relief assembly of this invention.

Referring now to FIG. 1 and FIG. 2, a safety pressure relief valve assembly of this invention, generally indicated by the reference numeral 10, is shown mounted onto a nipple 135 affixed to a first leg 131 of a branch "T" 130 having a second leg 132 mounted on a nipple 70 affixed to the outer wall 101 of a locomotive fuel tank 100 remote from a fueling spout 120. The vent pipe 134 extends from the third leg 133 of branch "T" 130 providing the normal vent path for the fuel tank. Where use of the vent pipe 134 is no longer desired, pressure relief valve assembly 10 may be mounted directly upon nipple 70. Relief valve 10 shows an enclosing means 60 associated with the outlet end 40 and an anti-blocking means 50, shown in dashed lines, which may be associated with the inlet end 30 for preventing foreign matter from entering the ends 30, 40. Although anti-blocking means 50 is shown extending from the valve member 18, anti-blocking means 50 may be separate from pressure relief valve assembly 10 and be separately disposed in vent port 71. In particular, safety pressure relief assembly 10 as best shown in FIG. 2, comprises a body 11 defined by at least one upstanding peripheral wall 12 and having open inlet end 30 and outlet end 40, means associated with inlet end 30 of body 11 for attaching to fuel tank 100, a bore 15 through body 11, a valve seat 16 disposed in an internal flange 17 in bore 15 and a movable valve member 18 resting on seat 16. Valve member 18 has a biasing means 19 associated therewith for biasing valve member 18 against valve seat 16 in a direction toward inlet end 30. Outlet end 40 opposite inlet end 30 has enclosing means 60 associated therewith for preventing foreign matter from entering outlet end 40 and inlet end 30 has anti-blocking means 50 associated therewith for preventing the inclusion of foreign matter in inlet end 30.

Enclosing means 60 of safety pressure relief assembly 10 comprises an inverted cup 20 associated with outlet end 40 wherein inverted cup 20 encloses bore 15 at the terminal end 13 and extends substantially the full length of body 11 from outlet end 40 to at least a lower surface 22 of a removal means 23 associated with valve body 11 at an opposite terminal end 14. Safety pressure relief assembly 10 is protected from unauthorized removal since inverted cup 20 extends substantially the full length of body 11 and thereby limits access to removal means 23 as cylindrical wall 61 of enclosing means 60 extends beyond the flats 24 to the lower surface 22 of removal means 23. In this manner, a special removal tool (not shown) must be utilized to encircle nipple 70 on tank 100 or nipple 135 on branch "T" 130 and be moved into position over flats 24 of removal means 23 in order to effectively wrench safety pressure relief assembly 10 from tank 100. Although a large pipe wrench could be used to grip the outer surface 62 of cylindrical wall 61, it is usually not possible to place such a large wrench in the protected location of relief assembly 10 and thus the integrity of the relief assembly is ensured.

Inverted cup 20 has a closed end 26 and an open end 27 wherein closed end 26 has a discharge means 28 disposed in a downwardly directed threaded internal wall 29 associated with closed end 26. Inverted cup 20 comprises a flat disc end wall 64 having an enclosing surface 65 on one side thereof and an outer peripheral edge 66, an outer cylindrical wall 61 having an inside diameter substantially equal to the outside diameter of outer peripheral edge 66 and defining an inside surface 67, and downwardly directed threaded internal wall 29. Downwardly directed threaded internal wall 29 is generally a threaded nipple coupler having an outside diameter and thread mating with threaded portion 41 of body 11. Discharge means 28 is disposed in one end of downwardly directed internal wall 29 by providing at least one port 43, such as a semi-circular recess, into one end 69 thereof. Downwardly directed threaded internal wall 29 is substantially centrally located on and affixed to enclosing surface 65. Outer peripheral edge 66 is then affixed to cylindrical wall 61 around the entire periphery of peripheral edge 66 of end wall 64. Open end 27 of inverted cup 20 is adapted to allow the discharge of pressure above atmospheric pressure from discharge means 28 through release means 42 as pressure buildup in a locomotive tank 100 occurs. In the preferred embodiment shown in FIGS. 1 and 2, downwardly directed threaded internal wall 29 is threadedly engaged with the threaded portion 41 of outlet end 40 although safety pressure relief assembly 10 may have inverted cup 20 permanently affixed to outlet end 40 as will be hereinafter described.

Figure 7:
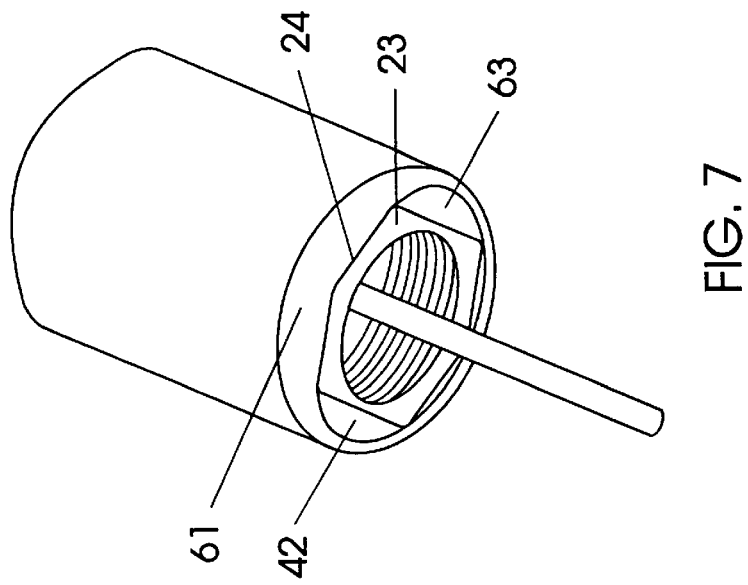
FIG. 7 is a perspective view of the safety pressure relief assembly of this invention adapted to be mounted horizontally on a locomotive fuel tank having a downwardly directed release means.

Safety pressure relief assembly 10 may be mounted substantially vertically on a fuel tank 100 as shown in FIG. 1 having release means 42 downwardly directed but may also be mounted substantially horizontally on tank 100 having release means 42 horizontally directed or may be mounted substantially horizontally on a tank 100 having release means 42 downwardly directed by affixing a portion of cylindrical wall 61 to removal means 23 enclosing a portion of annulus 63 as shown in the inlet end view of FIG. 7.

Inlet end 30 preferably also has anti-blocking means 50 associated therewith for preventing the inclusion of foreign objects in inlet end 30. In this preferred embodiment shown in FIGS. 1 and 2, anti-blocking means 50 comprises at least one elongate finger 51 extending into tank 100 from inlet end 30 of relief assembly 10. Elongate finger 51 of anti-blocking means 50 preferably extends into tank 100 through nipple 70 and comprises an extension of a stem 52 of valve member 18. It is readily apparent that since elongate finger 51 extends beyond the inlet end 30 of relief assembly 10 and into tank 100 beyond nipple 70, objects floating upon the surface of fuel in tank 100 cannot become lodged in port 71 of nipple 70 and hence also cannot become lodged in and block inlet end 30. Elongate finger 51 may have a spherically rounded end 53 on its free end 54 to further prevent floating objects such as a tank float from becoming impaled thereon.

Figure 8:
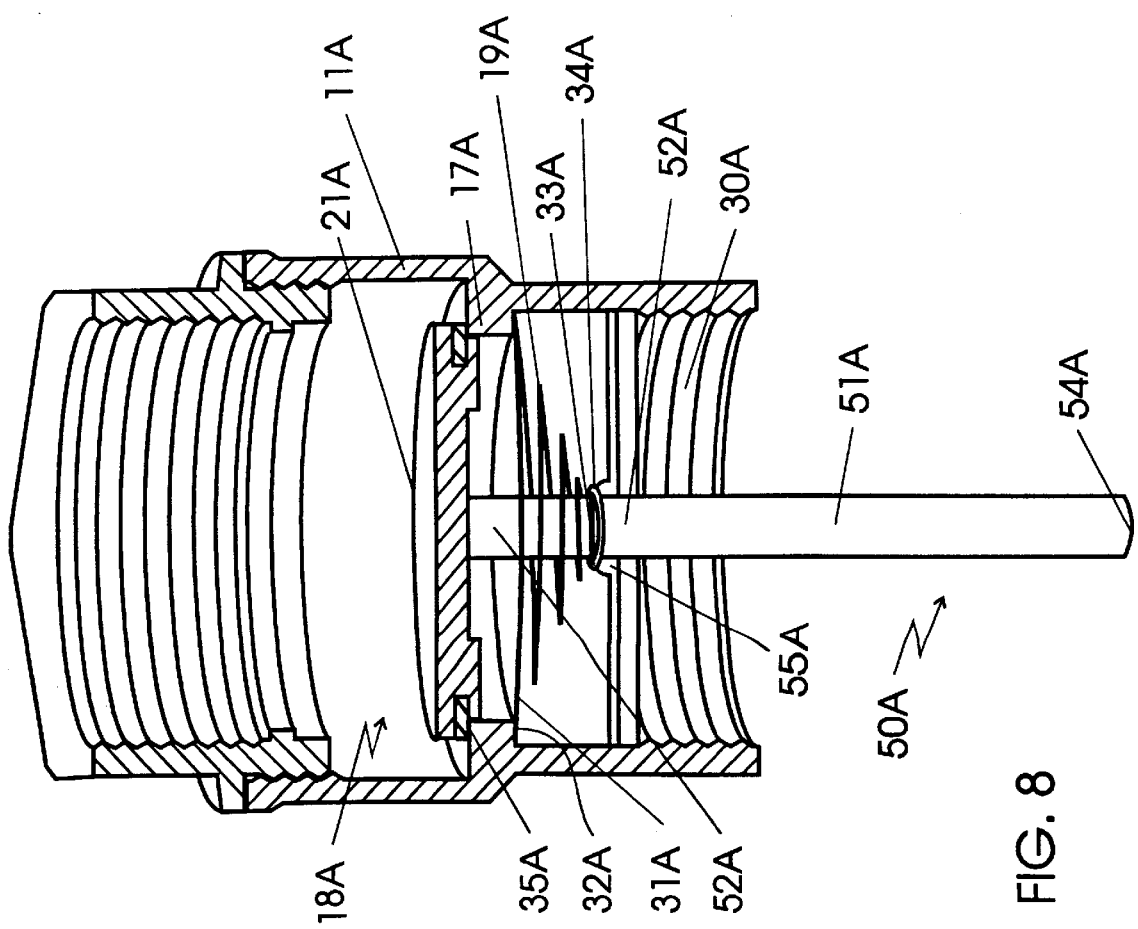
FIG. 8 is a section view of the safety pressure relief assembly of this invention showing an alternate valve member having anti-blocking means integral therewith.

In an alternate embodiment as shown in FIG. 8, anti-blocking means 50A may be integral with and comprise stem 52A having free end 54A of elongate finger 51 A extending into tank 100 from valve member 18A. In this embodiment, stem guide 55A is disposed in inlet end 30A of valve body 11A having an enlarged coil 31A of biasing means 19A bearing against an underside surface of internal flange 17A while smallest coil 33A bears against a spring support 34A associated with stem 52A between stem guide 55A and valve disc 21A. Alternately, although not shown, biasing spring 19A may be disposed toward the free end 54A of elongate finger 51A bearing on the bottom surface of stem support 55A wherein spring support 34A is associated with stem 52A also toward free end 54A and outboard of stem support 55A.

In another alternate embodiment shown in FIG. 4, anti-blocking means 50B extends into tank 100 from the inlet side surface 35B of valve member 18B spaced from center line 56B of stem 52B and valve member 18B. In this embodiment, stem 52B terminates at outlet surface 36B of valve member 18B but at least one of valve guides 37B extends into tank 100 from inlet side surface 35B through nipple 70. Valve guides 37B are usually square in cross section having one side 38B of the square adjacent to the lower edge 76B of member seat 75B. When member seat 75B is raised above valve seating surface 25, guides 37B follow along and remain extended below lower edge 39 of valve seating surface 25 to prevent valve member 18B from being cocked thereupon. Anti-blocking means 50B may also protrude from inlet side surface 35B of valve member 18B but spaced between stem 52B and from valve guides 37B. Such anti-blocking means 50B may be attached to inlet side surface 35B or may be extend through holes (not shown) disposed through valve member 18B.

Figure 6:
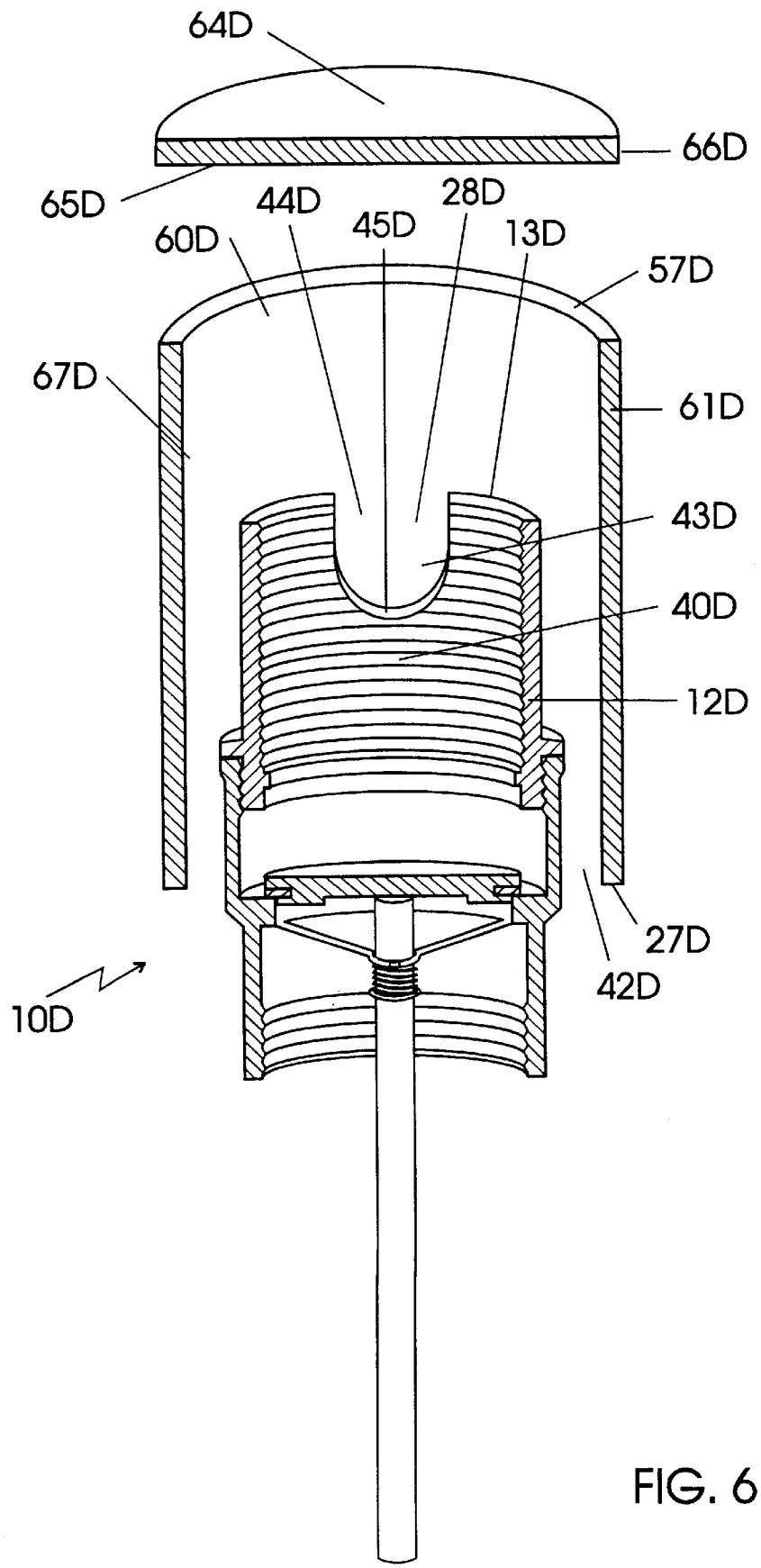
FIG. 6 is an partially exploded view of an alternate embodiment of this invention.

In an alternate embodiment shown in FIG. 6, safety pressure relief assembly 10D has a discharge means 28D disposed in wall 12D of outlet end 40D for discharging pressure above atmospheric pressure into enclosing means 60D. Enclosing means 60D comprises an end wall 64D affixed to terminal end 13D of body 11D after discharge means 28D is provided through wall 12D of body 11D. Discharge means 28D comprises at least one port 43D formed into wall 12D of outlet end 40D having a portion 44D, shown by dotted lines, of the surface 45D of said port defined by enclosing surface 65D of enclosing means 60D. Thus, discharge means 28D generally extends from terminal end 13D into wall 12D in a semi-circular fashion providing a semi-circular port 43D. Of course, port 43D could be another shape and could as well be formed entirely through wall 12D spaced from terminal end 13D.

Still referring to FIG. 6, after affixing end wall 64D to terminal end 13D of body 11D by attaching enclosing surface 65D around the outer periphery of terminal end 13D, outer cylindrical wall 61D of enclosing means 60D is affixed to the outer peripheral edge 66D of end wall 64D. As in the preferred embodiment, outer cylindrical wall 61D extends substantially the full length of body 11D encircling removal means 23D to prevent the ready removal of relief assembly 10D from tank 100. Release means 42D is formed in the annulus 63D between flats (not shown) of removal means 23D and inner cylindrical surface 67D of outer cylindrical wall 61D. As with the preferred embodiment, a special tool is utilized to install and remove relief assembly from tank 100.

In yet another alternate embodiment shown in FIG. 3, anti-blocking means 50C extends into tank 100 through inlet end 30 and nipple 70 and is attached to wall 12 of body 11. Anti-blocking means 50C is formed in an inverted "L" shape having the base leg 81 of the "L" disposed through a hole 80 in the wall 12 below internal flange 17C and attached to wall 12 by an affixing means 79. Exterior end 82 of base leg 81 may be threaded and a nut 83 comprising affixing means 79 threaded thereupon and tightened against outer surface 68 of body 11. Alternately, exterior end 82 may be thermally affixed to hole 80 by force fitting exterior end 82 of base leg 81 through hole 80 or by brazing base leg 81 to body 11. The upright leg 84 of the inverted "L" is directed toward opposite terminal end 14 and extends therebeyond a distance greater than the length of nipple 70 such that the free end 54C of anti-blocking means prevents foreign matter from entering inlet end 30. The anti-blocking means 50C may be attached in a similar manner to wall 136 of branch "T" 130 instead of through wall 12 of pressure relief valve 10 thereby permitting pressure relief valve 10 to be affixed to a free leg of branch "T" 130.

FIG. 5 shows another embodiment of the anti-blocking means 50 adapted to be associated with body 11 or with port 71. Anti-blocking means 50 comprises a thin ring 90 having a thread 91 upon the outer periphery 94 thereof adapted to be threaded into inlet end 30 of relief assembly 10. Thin ring 90 has a plurality of legs 93 extending from one surface 92 thereof which are longer than nipple 70. Legs 93 may have a filtering screen (not shown) attached to the outer surfaces 95 thereof providing a filtering means for relief assembly 10. Anti-blocking means 50 of FIG. 5 is threaded into inlet end 30 prior to installation of relief assembly 10 onto nipple 70. Anti-blocking means 50 is captured between the end 72 of nipple 70 and the uppermost threads of inlet end 30. In order to facilitate capture of anti-blocking means upon end 72 of nipple 70, thin ring 90 may have annulus 96, shown in dashed lines, extending from the surface 97 opposite surface 92 such that the end 98 of annulus 96 bears against the underside surface 32 of internal flange 17.

Where access to vent port 71 is limited and pressure relief valve assembly 10 cannot be mounted on branch "T" 130 above vent port 71 as shown in FIG. 1, branch "T" 130 is disposed in vent pipe 134 at a location spaced from vent port 71. Pressure relief valve assembly 10 is then mounted on third leg 133 of branch "T" 130 while an extension of vent pipe 134 protrudes from second leg 132. In this embodiment, the anti-blocking means of FIG. 5 is disposed in vent port 71 and captured thereonto by the flange or elbow (not shown) to which the vent pipe 134 is normally attached. Similarly, an anti-blocking means formed from a fueling screen of perforated or expanded metal or screen wire may be installed in vent port 71 and captured thereinto by the flange or elbow. In this manner, pressure relief valve assembly 10 is disposed remote from vent port 71 yet has an antiblocking means associated therewith to prevent blockage of inlet port 71.

A method of making the safety pressure relief assembly of this invention now follows. Pressure relief assembly generally indicated in FIGS. 1 and 2 by the reference numeral 10, is shown threaded onto a nipple 135 threaded into a first leg 131 of a branch "T" 130 having a second leg 132 threaded on a nipple 70 affixed to the outer wall 101 of a locomotive fuel tank 100 remote from a fueling spout 120. The vent pipe 134 normally used for venting locomotive fuel tank 100 is threaded into and extends from third leg 133 of branch "T" 130 providing the normal vent path for the fuel tank. Nipple 70 is typically a two (2") inch National Pipe Thread (NPT) threaded steel nipple welded to the upper surface of a locomotive fuel tank 100 and placed in a relatively secure location such as under or adjacent the frame of the locomotive. Safety pressure relief assembly 10 as best shown in FIG. 2, is a typical pressure relief valve commonly used in locomotive fuel tanks and is additionally used as a sewer relief valve and manufactured by Clayton Mark, Inc. of Rogers, Ark. as part number 3397E. Safety pressure relief assembly 10 comprises a body 11 usually of cast bronze having at least one upstanding peripheral wall 12. Open inlet end 30 and outlet end 40 are typically internally threaded having two (2") inch National Pipe Threads for attaching to fuel tank 100. A bore 15 is cast through body 11 with an internal flange 17 formed in the bore 15. A valve seat 16 is typically machined upon the internal flange 17 for receiving a movable valve member 18 resting thereon. Valve member 18 is also usually of cast bronze and typically has a seating surface 75 which may be either a tapered metallic seating surface or may be a flat surface having a polymeric washer associated therewith. Valve member 18 has seating surface 75 machined on a inlet side surface 35 and has a stem 52 extending from the outlet side surface 36. Inlet side surface 35 also has valve guides 37 cast thereonto adjacent to and extending from surface 35 a distance greater that the expected travel of valve member 18. Valve guides 37 are usually rectangular in cross section having one side 38 adjacent to the innermost edge 76 of valve seating surface 75. Guides 37 are adapted to follow along and remain extended below lower edge 39 of valve seating surface 25. One side 38 of each valve guide 37 may be machined with a slight convex curve equal or slightly less than the diameter of lower edge 76. Biasing means 19 biasing valve member 18 against valve seat 16 is typically a tapered coil spring having an enlarged base coil 31 with a diameter of one and one half inch and an apex smaller coil 33 with a diameter of approximately one half an inch. Biasing means 19 is typically an helically wound spring manufactured from 0.0625 inch spring coil wire with a height of approximately one and one quarter inches. Outlet end 40 and opposite inlet end 30 each have an hexagonal removing and installing means 23 cast upon the outer surface of body 11, inlet end 30 having a lower surface 22 formed thereon and outlet end 40 having terminal end 13 formed thereon. A valve stem guide 55 is typically formed in a removable cap portion 85 extending from terminal end 13 of outlet end 40 to a position above valve seat 25 such that biasing means 19 provides a positive sealing pressure on seat 25. Cap portion 85 is typically threaded upon a mating external thread on wall 12.

Enclosing means 60 of safety pressure relief assembly 10 is formed into an inverted cup 20 by first forming a flat disc end wall 64 of cold rolled steel plate having an enclosing surface 65 on one side thereof and an outer peripheral edge 66 approximately four and one half inches in diameter. End wall 64 may be machined or flame cut from cold rolled plate. An outer cylindrical wall 61 having an inside surface 67 and open ends 27 and 57 with an inside diameter of approximately four and one half inches in diameter and approximately six inches long is cut from a length of schedule 40 steel pipe. A downwardly directed threaded internal wall 29 approximately 3 inches in length is purchased as a threaded close nipple coupler having two inch (2") NPT on both ends. A discharge means 28 is formed in one end of downwardly directed internal wall 29 by machining or flame cutting at least one port 43, such as a semi-circular recess, into one end 69 thereof Downwardly directed threaded internal wall 29 is substantially centrally located on and welded to enclosing surface 65 having discharge means 28 placed contiguous with enclosing surface 65. Outer peripheral edge 66 is then welded to cylindrical wall 61 around the entire periphery of peripheral edge 66 of end wall 64. In the preferred embodiment shown in FIGS. 1 and 2, downwardly directed threaded internal wall 29 is then threadedly engaged with the threaded portion 41 of outlet end 40 enclosing means 60 thereby enclosing bore 15 at the terminal end 13 and extending substantially the full length of body 11 from outlet end 40 to at least lower surface 22 of removal means 23. Downwardly directed internal wall 29 is preferably lockingly engaged with threaded portion 41 of outlet end 40 by providing locking threads on the threaded portion 87 of downwardly directed threaded wall 29. Such locking threads may be formed by sawing a cut through the threads of threaded portion 87 perpendicular to the threads.

Safety pressure relief assembly 10 is typically mounted substantially vertically on a fuel tank 100 as shown in FIG. 1 with release means 42 formed in the annulus 63 between flats 24 of removal means 23 and inner cylindrical surface 67 of outer cylindrical wall 61. Thus release means 42 is downwardly directed. Of course, safety pressure relief assembly 10 may also be mounted substantially horizontally on tank 100 with release means 42 horizontally directed or may be mounted substantially horizontally on a tank 100 having release means 42 downwardly directed by affixing a portion of cylindrical wall 61 to removal means 23 enclosing a portion of annulus 63 as shown in the inlet end view of FIG. 7. Although usually manufactured from steel pipe and cold rolled plate, enclosing means may be manufactured from other metallic materials such as bronze, brass or aluminum.

Anti-blocking means 50 is formed in inlet end 30 comprising at least one elongate finger 51 extending into tank 100 from inlet end 30 of relief assembly 10. Elongate finger 51 of anti-blocking means 50 is formed on valve member 18 when valve member 18 is cast. Elongate finger 51 may have a spherically rounded end 53 on its free end 54 and is at least five inches in length in order that elongate finger 51 extends beyond the inlet end 30 of relief assembly 10 and into tank 100 beyond nipple 70 such that objects floating upon the surface of fuel in tank 100 cannot become lodged in port 71 of nipple 70 and hence also cannot become lodged in and block inlet end 30. Of course, elongate finger 51 may be force fit in a hole in the center of a valve disc 21 having free end 54 extending below inlet side surface 35 a sufficient distance to extend beyond inlet port 71 of nipple 70 and stem 52 extending above outlet surface 36 to accept biasing means 19 thereon.

As shown in FIG. 8, anti-blocking means 50A may be formed integral with and comprise stem 52A having free end 54A of elongate finger 51A extending into tank 100 from valve member 18A and having stem 52A located on inlet side surface 35A. Stem guide 55A is then formed in inlet end 30A of valve body 11A and free end 54A extends through stem guide 55A and into tank 100. Biasing means 19A is then installed such that enlarged base coil 31A bears against an underside surface 32A of internal flange 17A while smallest apex coil 33A bears against a spring support 34A associated with stem 52A between stem guide 55A and valve disc 21A. Alternately, although not shown in either FIG. 1 or FIG. 8, biasing spring 19 may be disposed toward the free end 54 of elongate finger 51 bearing on the bottom surface of stem support 55 wherein spring support 34 is associated with stem 52 also toward free end 54 and outboard of stem support 55.

In another alternate embodiment shown in FIG. 4, at least one of valve guides 37B is elongated when valve member 18B is cast such that valve guide 37B extends into tank 100 from inlet side surface 35B through nipple 70. Valve guides 37B are formed as rectangular appendages from inlet side surface 35B of valve member 18B and have one side 38B of the rectangle adjacent to the lower edge 39 of valve seating surface 25. Thus, one side 38B guides against internal flange 17 preventing valve member 18B from becoming cocked upon valve seat 16 while the extended end 74B of valve guide 37B forms antiblocking means 50B. Of course, anti-blocking means 50B may be formed through valve disc 21B and protrude from inlet side surface 35B of valve member 18B but spaced between stem 52B and from valve guides 37B. Such anti-blocking means 50B may be attached to inlet side surface 35B or may be extend through holes (not shown) disposed through valve member 18B.

In yet another alternate embodiment as shown in FIG. 3, anti-blocking means 50C is formed as an inverted "L" shape from three eighths diameter metallic rod having the base leg 81 of the "L" disposed through a hole 80 in the wall 12 below internal flange 17 and either brazed to wall 12 or affixed thereto by having exterior end 82 of base leg 81 threaded and having a nut 83 threaded thereupon and tightened against outer surface 68 of body 11. Alternately, exterior end 82 may be thermally affixed to hole 80 by force fitting exterior end 82 of base leg 81 through hole 80 or by brazing base leg 81 to body 11. The upright leg 84 of the inverted "L" comprising elongate finger 51C is directed toward opposite terminal end 14 and extends therebeyond a distance greater than the assembled length of nipple 70, "T" 130 and nipple 135 such that the free end 54C of anti-blocking means 50C prevents foreign matter from entering inlet end 30.

Anti-blocking means of FIG. 5 is formed from a thin ring 90 having a thread 91 upon the outer periphery 94 thereof. Thin ring 90 has a plurality of legs 93 formed on and extending from one surface 92 thereof which are longer than nipple 70. Legs 93 may have a filtering screen (not shown) attached to the outer surfaces 95 thereof providing a filtering means for relief assembly 10. In order to facilitate capture of anti-blocking means upon end 72 of nipple 70, thin ring 90 may have annulus 96 formed on and extending from the surface 97 opposite surface 92 such that the end 98 of annulus 96 bears against the underside surface 32 of internal flange 17. Thin ring 90 and legs 93 may be from metallic material cast in the tepee frame shape shown or may be formed by welding legs 93 upon thin ring 90.

As shown in FIG. 6, safety pressure relief assembly 10D has a discharge means 28D formed through wall 12D of outlet end 40D by cutting or casting at least one port 43D in the terminal end 13D of outlet end 40D. Enclosing means 60D of safety pressure relief assembly 10D is formed into an inverted cup by first forming a flat disc end wall 64D of cold rolled steel plate having an enclosing surface 65D on one side thereof and an outer peripheral edge 66D approximately four and one half inches in diameter. End wall 64D may be machined or flame cut from the cold rolled plate. An outer cylindrical wall 61D having an inside surface 67D and open ends 27D and 57D with an inside diameter of approximately four and one half inches and approximately six inches long is cut from a length of schedule 40 steel pipe. End wall 64D of enclosing means 60D is substantially centrally located on and welded to terminal end 13D of body 11D having discharge means 28D contiguous with enclosing surface 65D. Outer peripheral edge 66D is then welded to cylindrical wall 61D around the entire periphery of peripheral edge 66D of end wall 64D. A portion of the surface 45D of port 43D is defined by enclosing surface 65D of enclosing means 60D as shown by dotted lines. Thus, discharge means 28D generally extends from terminal end 13D into wall 12D in a semi-circular fashion. Of course, port 43D could be another shape and could as well be formed entirely through wall 12D spaced from terminal end 13D. After welding end wall 64D to terminal end 13D of body 11D, outer cylindrical wall 61D of enclosing means 60D is welded to outer peripheral edge 66D of end wall 64D such that outer cylindrical wall 61D extends substantially the full length of body 11D encircling removal means 23 to prevent the ready removal of relief assembly 10D from tank 100. Release means 42D is formed in the annulus 63D between flats of removal means and inner cylindrical surface 67D of outer cylindrical wall 61D. As with the preferred embodiment, a special tool is utilized to install and remove relief assembly from tank 100. Although usually manufactured from steel pipe and cold rolled plate, enclosing means 60D may be manufactured from other metallic materials such as bronze, brass or aluminum or formed of a thermoplastic material.

While the foregoing description of the preferred embodiment and best mode of the invention known to the applicant at the time of filing the application has been presented for the purposes of illustration and description as required by the Patent Statute, it is to be understood that other forms and methods can be utilized and still fall within the scope of the appended claims. The foregoing description is not intended to be exhaustive or to limit the invention to the precise form disclosed and obviously many modifications and variations are possible in the light of the above teaching. The embodiment was chosen and described in order to best explain the principles of the invention and its practical applications to thereby enable others skilled in the art to best utilize the invention in various embodiments and with various modifications as are suited to the particular use contemplated.

We claim:

1. In a safety pressure relief assembly comprising a body defined by at least one upstanding peripheral wall and having open ends, means associated with an inlet end of the body for attaching to a fuel tank, a bore through the body, a valve seat disposed in an internal flange in the bore and a movable valve member resting on the seat, the valve member having biasing means associated therewith for biasing the valve member against the valve seat in a direction toward the inlet end, the improvement wherein the outlet end opposite said inlet end has enclosing means associated therewith for preventing the inclusion of foreign matter from entering said outlet end and said outlet end has discharge means disposed in said wall for discharging pressure above atmospheric pressure into said enclosing means.

2. A safety pressure relief assembly as described in claim 1 wherein said discharge means disposed in said wall is at least one port machined into said wall at said outlet end having a portion of the surface of said port defined by a portion of said enclosing means.

3. A safety pressure relief assembly as described in claim 2 wherein said port in said wall has a concave surface recessed into said wall from the terminal end thereof and further has an enclosing surface formed by a planar surface of said enclosing means.

4. In a safety pressure relief assembly comprising a body defined by at least one upstanding peripheral wall and having open ends, means associated with an inlet end of the body for attaching to a fuel tank, a bore through the body, a valve seat disposed in an internal flange in the bore and a movable valve member resting on the seat, the valve member having biasing means associated therewith for biasing the valve member against the valve seat in a direction toward the inlet end, the improvement wherein the outlet end opposite said inlet end has enclosing means associated therewith for preventing the inclusion of foreign matter from entering said outlet end, said enclosing means in said outlet end comprising an inverted cup associated with said outlet end wherein said inverted cup encloses said bore and extends substantially the full length of said body from said outlet end to at least a lower surface of a removal means associated with said valve body.

5. A safety pressure relief assembly as described in claim 4 wherein said inverted cup is permanently affixed to said outlet end.

6. A safety pressure relief assembly as described in claim 4 wherein said inverted cup has an open end for discharging said pressure above atmospheric pressure.

7. A safety pressure relief assembly as described in claim 4 wherein said inverted cup has a closed end and an open end, said closed end having discharge means disposed in a downwardly directed threaded internal wall attached to said closed end.

8. A safety pressure relief assembly as described in claim 7 wherein said downwardly directed threaded internal wall is threadedly engaged with said outlet end.

9. A safety pressure relief assembly as described in claim 4 wherein said inverted cup extending substantially the full length of said body limits access to a removal means associated with said valve body thereby preventing removal of said assembly from a tank.

10. A safety pressure relief assembly as described in claim 4 wherein said assembly is mounted substantially vertically on said tank and has a release means downwardly directed.

11. A safety pressure relief assembly as described in claim 4 wherein said assembly is mounted substantially horizontally on said tank and has a release means horizontally directed.

12. A safety pressure relief assembly as described in claim 4 wherein said assembly is mounted substantially horizontally on said tank and has a release means downwardly directed.

13. In a safety pressure relief assembly comprising a body defined by at least one upstanding peripheral wall and having open inlet and outlet ends, means associated with the inlet end of the body for attaching to a fuel tank, a bore through the body, a valve seat disposed in an internal flange and a valve support in the bore, a valve member resting on the seat, the valve member having biasing means associated with a stem of said valve member for biasing the valve member against the valve seat in a direction toward the inlet end, the improvement wherein said inlet end has anti-blocking means associated therewith and said outlet end has enclosing means associated therewith for preventing the inclusion of foreign objects from entering either of said ends and wherein said enclosing means on said outlet end comprises an inverted cup associated with said outlet end wherein said inverted cup encloses said bore and extends substantially the full length of said body from said outlet end to at least a lower surface of a removal means associated with said valve body.

14. A safety pressure relief assembly as described in claim 13 wherein said inverted cup is permanently affixed to said outlet end.

15. A safety pressure relief assembly as described in claim 13 wherein said inverted cup has an open end for discharging said pressure above atmospheric pressure.

16. A safety pressure relief assembly as described in claim 13 wherein said inverted cup extending substantially the full length of said body limits access to a removal means associated with said valve body thereby preventing removal of said assembly from a tank.

17. A safety pressure relief assembly as described in claim 13 wherein said anti-blocking means associated with said inlet comprises at least one elongated finger extending into the tank from said inlet end of said valve.

18. A safety pressure relief assembly as in claim 17 wherein said anti-blocking means comprises at least one elongated finger extending into said tank from said valve member.

19. A safety pressure relief assembly as described in claim 18 wherein said antiblocking means extends into said tank from a central stem of said valve member.

20. A method of making a safety pressure relief assembly by forming a first tubular body having a first inlet end and a second outlet end, a wall of given thickness with a bore through the body and having an internal flange and a valve support in the bore, forming a means on the first end of the body for attaching the body to a fuel tank, forming a valve seat in the internal flange, forming a valve member adapted for resting on the seat and having a stem extending from one side of the valve member, forming a biasing means, inserting the stem of the valve member through the valve support, attaching one end of the biasing means to the valve support and bearing the other end against the one side of the valve member, thereby biasing the valve member against the valve seat in a direction toward the first inlet end, forming a discharge means in the second outlet end, forming an enclosing flange for the outlet end, affixing the enclosing flange on the outlet end, forming a second tubular body of larger internal diameter than the external diameter of the first tubular body affixing one of the open ends of the second tubular body to the enclosing flange wherein the enclosing flange and second tubular body comprise enclosing means for preventing the inclusion of foreign objects from entering the first end of the first body thereby keeping the safety pressure relief assembly in full operational condition at all times.

\* \* \* \* \*